US012010056B2

United States Patent
Nagarajan et al.

(10) Patent No.: US 12,010,056 B2
(45) Date of Patent: Jun. 11, 2024

(54) DEMODULATION REFERENCE SIGNAL (DMRS) SEQUENCE SIGNALING

(71) Applicant: QUALCOMM Incorporated, San Diego, CA (US)

(72) Inventors: Anantha Krishna Karthik Nagarajan, San Diego, CA (US); Jun Ma, San Diego, CA (US); Morteza Soltani, San Diego, CA (US); Xiaoxia Zhang, San Diego, CA (US); Iyab Issam Sakhnini, San Diego, CA (US); Wooseok Nam, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/453,814

(22) Filed: Nov. 5, 2021

(65) Prior Publication Data
US 2022/0239427 A1    Jul. 28, 2022

Related U.S. Application Data

(60) Provisional application No. 63/141,330, filed on Jan. 25, 2021.

(51) Int. Cl.
*H04W 72/04*    (2023.01)
*H04L 5/00*    (2006.01)
(Continued)

(52) U.S. Cl.
CPC ............ *H04L 5/0048* (2013.01); *H04L 5/006* (2013.01)

(58) Field of Classification Search
CPC ....... H04L 5/0048; H04L 5/006; H04L 5/001; H04L 5/0094; H04L 5/0051
(Continued)

(56) References Cited

U.S. PATENT DOCUMENTS

| 2011/0199986 A1* | 8/2011 | Fong .................. H04L 5/0073 370/329 |
| 2019/0379433 A1* | 12/2019 | Chen .................. H04L 5/0051 |

(Continued)

FOREIGN PATENT DOCUMENTS

| EP | 3591881 A1 | 1/2020 |
| EP | 3605864 A1 | 2/2020 |

(Continued)

OTHER PUBLICATIONS

International Search Report and Written Opinion—PCT/US2021/062902—ISA/EPO—dated Mar. 24, 2022.

*Primary Examiner* — Maharishi V Khirodhar
(74) *Attorney, Agent, or Firm* — Patterson + Sheridan, LLP

(57) ABSTRACT

Certain aspects of the present disclosure provide techniques for demodulation reference signal (DMRS) sequence selection. One aspect provides a method for wireless communication by a first wireless node. The method generally includes selecting a type of DMRS sequence to be used for communication with a second wireless node based on a signal quality associated with the communication, receiving a message having the type of DMRS sequence, and performing channel estimation based on the DMRS sequence using the message.

30 Claims, 9 Drawing Sheets

(51) Int. Cl.
*H04W 76/00* (2018.01)
*H04W 88/08* (2009.01)

(58) Field of Classification Search
USPC .......................................................... 370/329
See application file for complete search history.

(56) References Cited

U.S. PATENT DOCUMENTS

| | | | |
|---|---|---|---|
| 2020/0266947 A1* | 8/2020 | Noh .................... | H04L 27/2615 |
| 2021/0014831 A1* | 1/2021 | Ryu ...................... | H04W 72/02 |
| 2021/0044981 A1 | 2/2021 | Bhattad et al. | |
| 2021/0144743 A1* | 5/2021 | Rastegardoost ...... | H04W 72/23 |
| 2021/0235430 A1* | 7/2021 | Liu ................... | H04W 74/0833 |
| 2023/0156856 A1* | 5/2023 | Liu ....................... | H04W 76/27 |
| | | | 370/329 |

FOREIGN PATENT DOCUMENTS

| | | | |
|---|---|---|---|
| EP | 3605988 A1 | 2/2020 | |
| WO | 2017119720 A2 | 7/2017 | |

\* cited by examiner

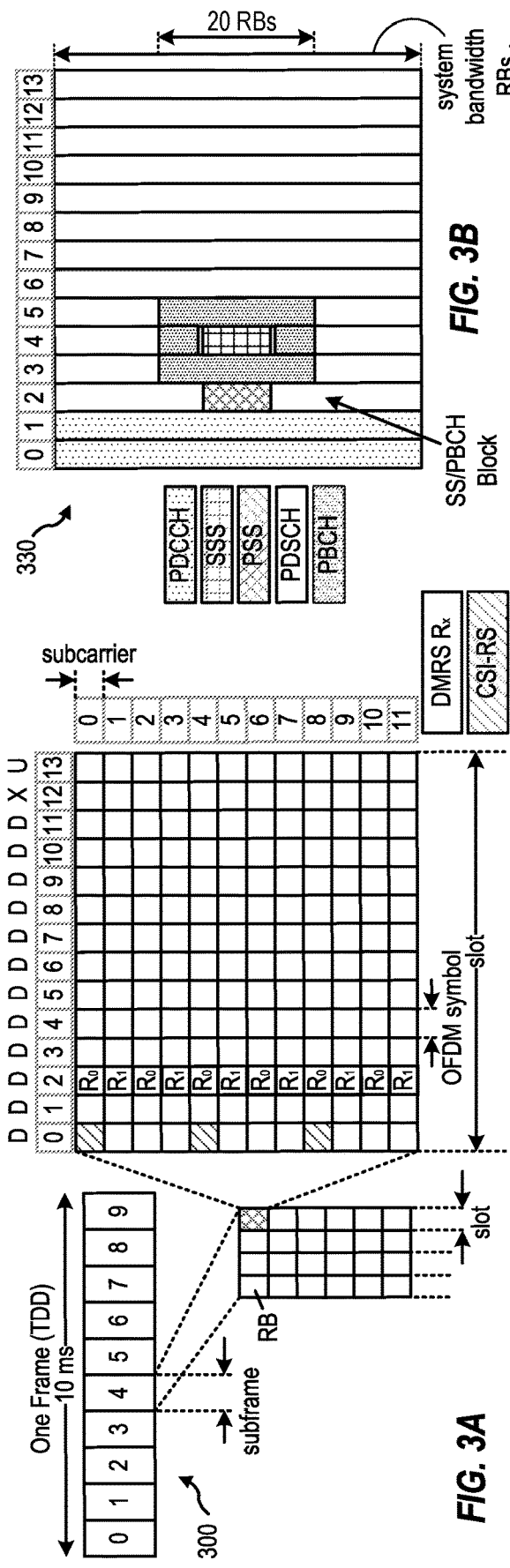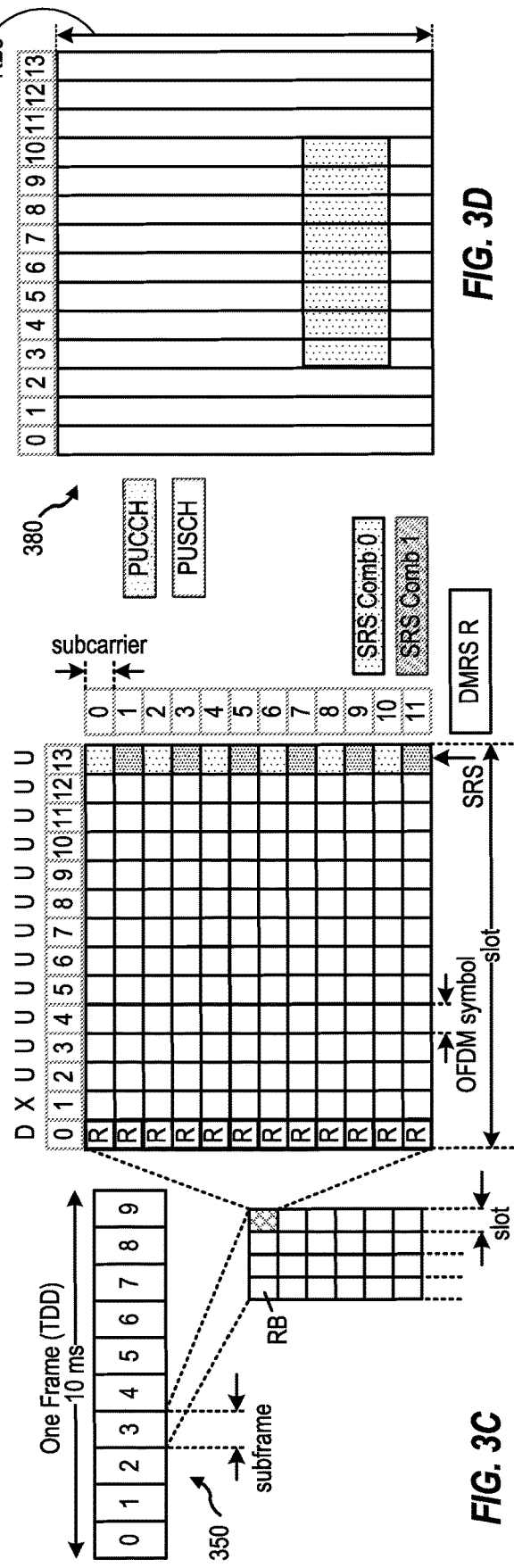

DEMODULATION REFERENCE SIGNAL (DMRS) SEQUENCE SIGNALING

CROSS-REFERENCE TO RELATED APPLICATIONS

The present application claims benefit of and priority to U.S. Provisional Patent Application Ser. No. 63/141,330, filed Jan. 25, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for selection of a type of sequence for a demodulation reference signal (DMRS).

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

A wireless device may perform channel estimation to obtain channel quality information that allows the device to properly decode received signals. As the demand for mobile broadband access continues to increase, the demand for improvements to channel estimation continues to increase as well.

SUMMARY

One aspect provides a method for wireless communication by a first wireless node. The method generally includes selecting a type of demodulation reference signal (DMRS) sequence to be used for communication with a second wireless node based on a signal quality associated with the communication, generating a message having the type of DMRS sequence, and transmitting the message to the second wireless node.

Another aspect provides a method for wireless communication by a first wireless node. The method generally includes selecting a type of demodulation reference signal (DMRS) sequence to be used for communication with a second wireless node based on a signal quality associated with the communication, receiving a message having the type of DMRS sequence, and performing channel estimation based on the DMRS sequence using the message.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for configuring a demodulation reference signal (DMRS) sequence type.

Some aspects enable a flexible DMRS sequence type configuration, allowing a tradeoff between channel estimation performance and processing complexity at a receiver (e.g., user equipment (UE)). For example, a wireless node may select between using a pseudo-noise (PN) or Zadoff-Chu (ZC) sequence for DMRS based on various considerations. A PN sequence is less computationally complex than a ZC sequence, but provides a lower performance for channel estimation as compared to the ZC sequence when using a higher order modulation and coding scheme (MCS). A higher order MCS may be used in a higher signal quality scenario (e.g., a higher signal-to-interference-plus-noise ratio (SINR)). In some aspects of the present disclosure, a wireless node may select the sequence type for DMRS based on signal quality. For example, if a higher-order MCS is used (e.g., indicating a higher SINR), then ZC may be selected as the sequence for DMRS to take advantage of the higher channel estimation performance associated with ZC sequences. On the other hand, if a lower order MCS is used (e.g., indicating a lower SINR), PN may be selected as the sequence for DMRS, lowering processing complexity at a receiver. Accordingly, certain aspects of the present disclosure allow for the selection of a sequence having a lower processing complexity when appropriate given the signal quality scenario, improving processing efficiency at a receiver. For example, a UE may process (e.g., perform channel estimation for) a received packet more efficiently and save power due to the lower processing complexity of the selected sequence for DMRS.

Introduction to Wireless Communication Networks

Figure 1:
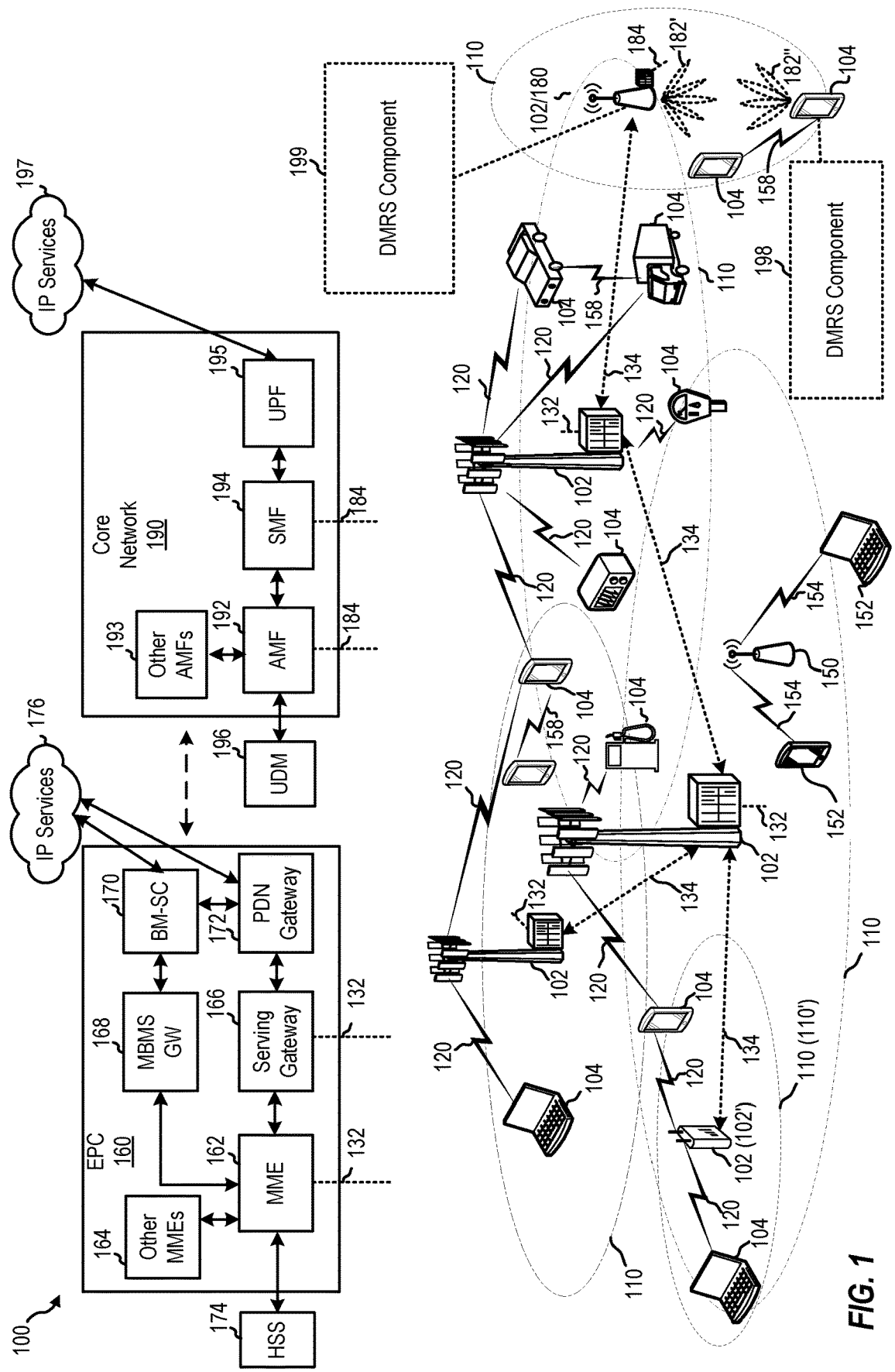
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes DMRS component 199, which may be configured to select a sequence for DMRS to be used for communication. Wireless communication system 100 further includes DMRS component 198, which may be used configured to select a sequence for DMRS to be used for communication.

Figure 2:
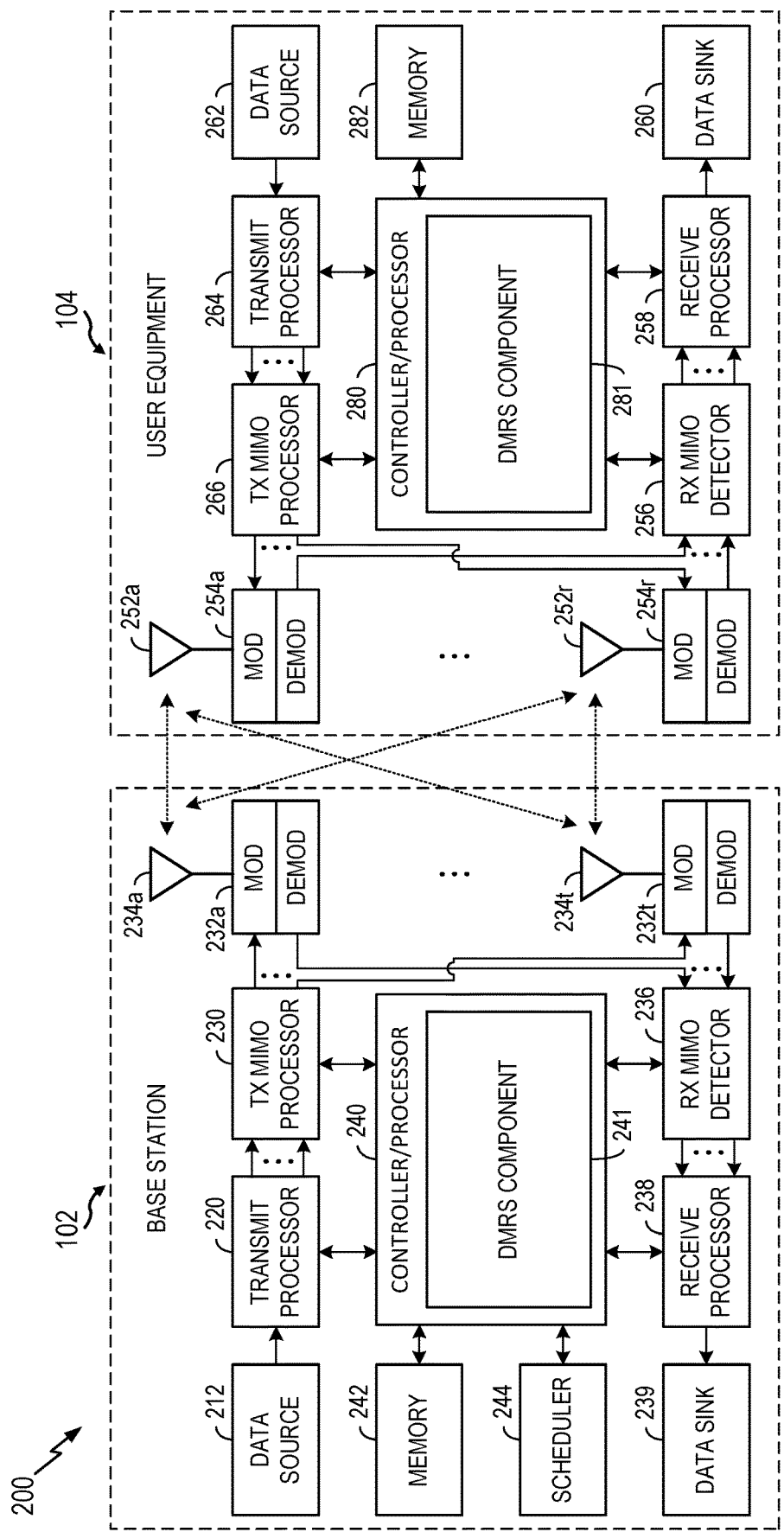
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes DMRS component 241, which may be representative of DMRS component 199 of FIG. 1. Notably, while depicted as an aspect of controller/processor 240, DMRS component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes DMRS component 281, which may be representative of DMRS component 198 of FIG. 1. Notably, while depicted as an aspect of controller/processor 280, DMRS component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Single Carrier (SC) Waveforms

A single carrier (SC) waveform and time domain symbol sequencing may be associated with a lower peak-to-average power ratio (PAPR) than multicarrier waveforms. A lower PAPR facilitates a higher power amplifier (PA) efficiency in the transmit chain of a transmitter of a wireless node (e.g., a PA of transceiver 232 or transceiver 254 of FIG. 2), resulting in extended battery life for the wireless node. A transmitter design for supporting SC waveforms may be simpler than a transmitter design for supporting multi-carrier waveforms. An equalizer may be used to achieve high spectral efficiency in the presence of multipath interference between a transmitter and a receiver. One example waveform that may be used for SC may include SC-frequency domain equalization (FDE), as described in more detail herein.

For an OFDM-based multicarrier waveform and frequency domain symbol sequencing, multiple orthogonal sub-carriers within a given carrier bandwidth may be supported. Integration of OFDM-based multicarrier waveform with multiple-input multiple-output (MIMO) may lead to improved spectral efficiency. One example waveform that may be used for OFDM-based multicarrier waveform includes cyclic prefix (CP)-OFDM. Another example waveform that may be used for OFDM-based multicarrier waveform includes discrete Fourier transform (DFT) spread (DFT-s)-OFDM.

SC waveforms may have a lower PAPR as compared to CP-OFDM/DFT-s-OFDM. Therefore, a UE may be able to transmit with more power since less PA back off may occur. In other words, a higher PAPR signal may cause the PA to operate at a lower power level setting to accommodate the higher PAPR. Thus, a lower PAPR allows the PA to transmit with more power as it allows the PA to operate at a higher power level setting. OFDM-based multi-carrier waveforms are suitable for scenarios where energy efficiency specifications are more relaxed, whereas SC waveform may be used for scenarios with higher energy efficiency specifications.

Example Transmit and Receive Chains for Single Carrier (SC) Waveforms

Figure 4:
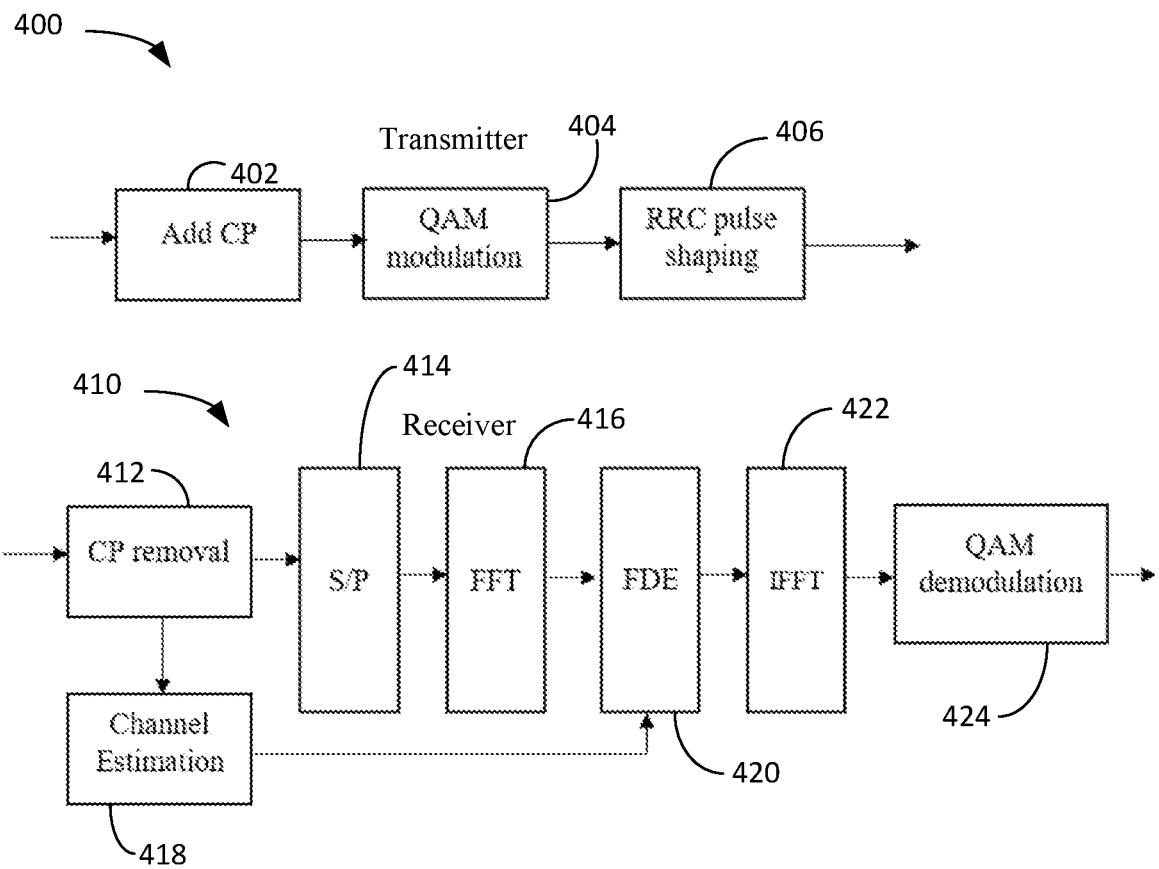
FIG. 4 depicts example transmit and receive chains.

FIG. 4 depicts example transmit chain and receive chain for supporting quadrature amplitude modulation (QAM) with a SC-FDE waveform. The transmit and receive chains of FIG. 4 may be part of the transceivers 232, 254 of FIG. 2. SC-QAM with SC-FDE has various advantages, such as a lower PAPR than multi-carrier waveforms, lower adjacent channel leakage ratio (ACLR) due to the use of a pulse shaping filter, and a simple waveform synthesis at the transmitter. SC-QAM with SC-FDE also enables frequency domain equalization in the receiver to reduce interference associated with multipath interference by using a cyclic prefix (CP). In other words, inserting a CP allows performance improvements when implementing frequency domain equalization at the receiver. On the other hand, the addition of the CP for QAM with SC-FDE may result in a slight degradation in spectral efficiency.

As illustrated, at a transmit chain of a transmitter 400, a CP addition component 402 may be used to append a CP for a packet. The packet may be provided to a QAM modulation component 404 and root raised cosine (RRC) pulse shaping component 406 for processing prior to transmission to a receiver 410. At the receiver 410, a CP removal component 412 may be used to remove the CP from each symbol of the packet, which may be then provided to a serial-to-parallel conversion (S/P) component 414 which provides a digital data stream to a fast Fourier transform (FFT) component 416. The FFT component 416 converts the digital data stream from the time domain to the frequency domain.

As illustrated, once the CP is removed, the packet may also be sent to a channel estimation component 418. The channel estimation component 418 may generate a channel estimate using a demodulation reference signal (DMRS) of the received packet. The results of channel estimation may be provided to a frequency domain equalizer (FDE) component 420. Via the FDE component 420, the output of the FFT component 416 may be processed based on a channel estimate provided by the channel estimation component 418. The resulting equalized output of the FDE component 420 is then converted back to the time domain using an inverse fast Fourier transform (IFFT) component 422, and demodulated using a QAM demodulation component 424, as illustrated.

In some implementations, a fractionally-spaced equalizer (FSE) for the SC-FDE waveform may be used, which has performance advantages over a traditional symbol spaced equalizer because it is robust against the sampling phase. A factor that affects the performance of the SC-FDE receiver (which incorporates minimum mean-squared error (MMSE)-based FSE) is the performance of the channel estimation algorithm (e.g., implemented at the channel estimation component 418). For example, suppose the FSE is performed at a 2× symbol rate. The corresponding channel (e.g., at 2× symbol rate) may be estimated by correlation using equation:

$$h = \frac{1}{N}(y \otimes (x_{rev} \uparrow 2)),$$

where h represents the channel response, y denotes the vector of received samples, x denotes the training sequence, and $x_{rev}[n]=x^*[-n]$ for n=0, 1, . . . N−1, $\otimes$ denoting a circular convolution operation. In other words, a known sequence used to transmit a DMRS may be correlated with the actually received DMRS to estimate the channel and implement the equalizer. One of the factors that can affect the performance of the correlation-based channel estimation for the SC-FDE is the type of DMRS sequence chosen. In other words, the better the autocorrelation function of the sequence used for DMRS to estimate the channel, the more effective the channel estimation function may be.

Aspects Related to Sequence Selection for Demodulation Reference Signal (DMRS)

Having different DMRS sequences for channel estimation may be useful as it offers more flexibility in UE operation. Some example types of DMRS sequences may include a pseudo-noise (PN) sequence or Zadoff-Chu (ZC) sequence. Energy-efficient UEs, or UEs operating in an energy-efficient mode, could employ PN sequences as they are simpler to implement, while high-performance UEs (e.g., that use a more spectrally efficient modulation and coding schemes (MCS)) could employ the more complex ZC sequences.

Generally, PN sequences use 1's and −1's, making the channel estimation process less computationally complex at the receiver. A PN sequence also provides a wide array of possible sequences of different lengths. However, PN sequences do not have an ideal autocorrelation function, which may lead to lower channel estimation performance as compared to ZC sequences. Example PN sequences include m-sequences, Gold codes, or Kasami codes. Complex ZC sequences exhibit an ideal autocorrelation function. In other words, the out-of-phase autocorrelation for a ZC sequences is 0. However, since ZC sequences involve complex quantities, implementation may be more computationally involved, especially at the receiver when performing channel estimation.

For a low signal-to-interference-plus-noise ratio (SINR) regime, a channel (e.g., PDSCH) with a PN-sequence-based DMRS has a similar performance to a channel with a ZC-sequence based DMRS. Lower range MCS's may be used for a low SINR regime. For a high SINR regime, the channel (e.g., PDSCH) with a ZC-sequence-based DMRS has performance advantages over a PN-sequence-based DMRS. Higher range MCS's may be used for a high SINR regime.

Certain aspects of the present disclosure are directed to the selection of a DMRS sequence type based on signal quality (e.g., SINR, MCS, and others). For example, in a lower SINR scenario, where a low-order MCS may be used for a channel (e.g., PDSCH), a wireless node (e.g., BS) may employ a PN-sequence-based DMRS. The selection of the PN sequence for the DMRS may simplify the receiver's channel estimation process by reducing multiplications (e.g., instead use additions and subtractions, which are less computationally demanding) with slight performance loss. On the other hand, at a higher SINR scenario, where a high-order MCS is employed for a channel and a higher performance is desired, the wireless node (e.g., BS) may employ a ZC-sequence based DMRS.

Example Operations for DMRS Sequence Selection

Figure 5:
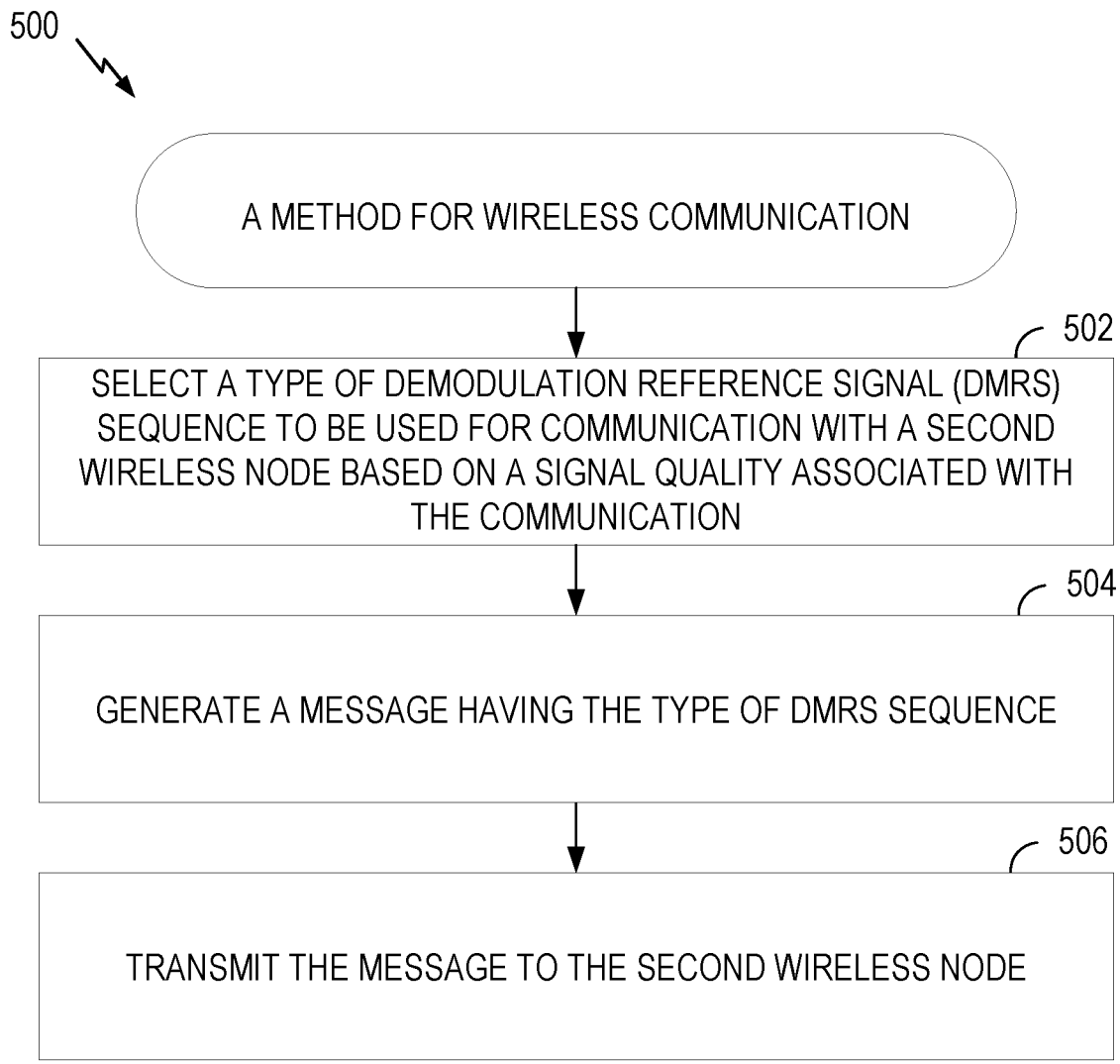
FIG. 5 is a flow diagram illustrating example operations for wireless communication by a transmitter device, in accordance with certain aspects of the present disclosure.

FIG. 5 is a flow diagram illustrating example operations 500 for wireless communication. The operations 500 may be performed, for example, by a first wireless node (e.g., a BS such as the BS 102 in the wireless communication network 100 of FIG. 1 or a UE, such as the UE 104 in the wireless communication system 100 of FIG. 1).

The operations 500 may be implemented as software components that are executed and run on one or more processors (e.g., controller/processor 240 or 280 of FIG. 2). Further, the transmission and reception of signals by the BS in operations 500 may be enabled, for example, by one or more antennas (e.g., antennas 234 or 252 of FIG. 2). In certain aspects, the transmission and/or reception of signals by the BS or UE may be implemented via a bus interface of one or more processors (e.g., controller/processor 240 or 280 or DMRS component 241 or 281) obtaining and/or outputting signals.

Operations 500 begin, at block 502, by the first wireless node selecting a type of DMRS sequence to be used for communication with a second wireless node (e.g., a UE, such as a UE 104 in FIG. 1) based on a signal quality associated with the communication. For example, the BS may determine an MCS to be used for the communication with the wireless node, and the selecting of the type of DMRS sequence may include selecting the type of DMRS sequence based on the MCS. If the determined MCS is a first MCS, the selected type of DMRS sequence may be a PN sequence, and if the determined MCS is a second MCS, the selected type of DMRS sequence may be a ZC sequence, the second MCS having a higher order than the first MCS.

In some aspects, the selecting of the type of DMRS sequence based on the signal quality at block 502 may include selecting a length of the DMRS sequence based at least in part on a Doppler spread associated with the communication. For example, a shorter DMRS sequence may be selected for a higher Doppler spread, and a longer DMRS sequence may be selected for a lower Doppler spread.

In some aspects, the selecting of the type of DMRS sequence based on the signal quality at block 502 may include selecting the type of DMRS sequence based on a mapping between one or more candidate MCSs and one or more candidate DMRS sequence types. The BS may indicate the mapping to the second wireless node (e.g., a UE).

In some aspects, the first wireless node may receive an indication (e.g., a request for a type of sequence to be used, or signal quality parameters) from the second wireless node, and the selecting of the type of DMRS sequence may be further based on the indication from the second wireless node. For example, the first wireless node may receive a request for a type of DMRS sequence to be used for the communication, receive an indication of one or more signal quality parameters associated with the communication, or both.

At block 504, the first wireless node may generate a message (e.g., a PDSCH) having the selected type of DMRS sequence. At block 506, the first wireless node may transmit the message to the second wireless node.

Figure 6:
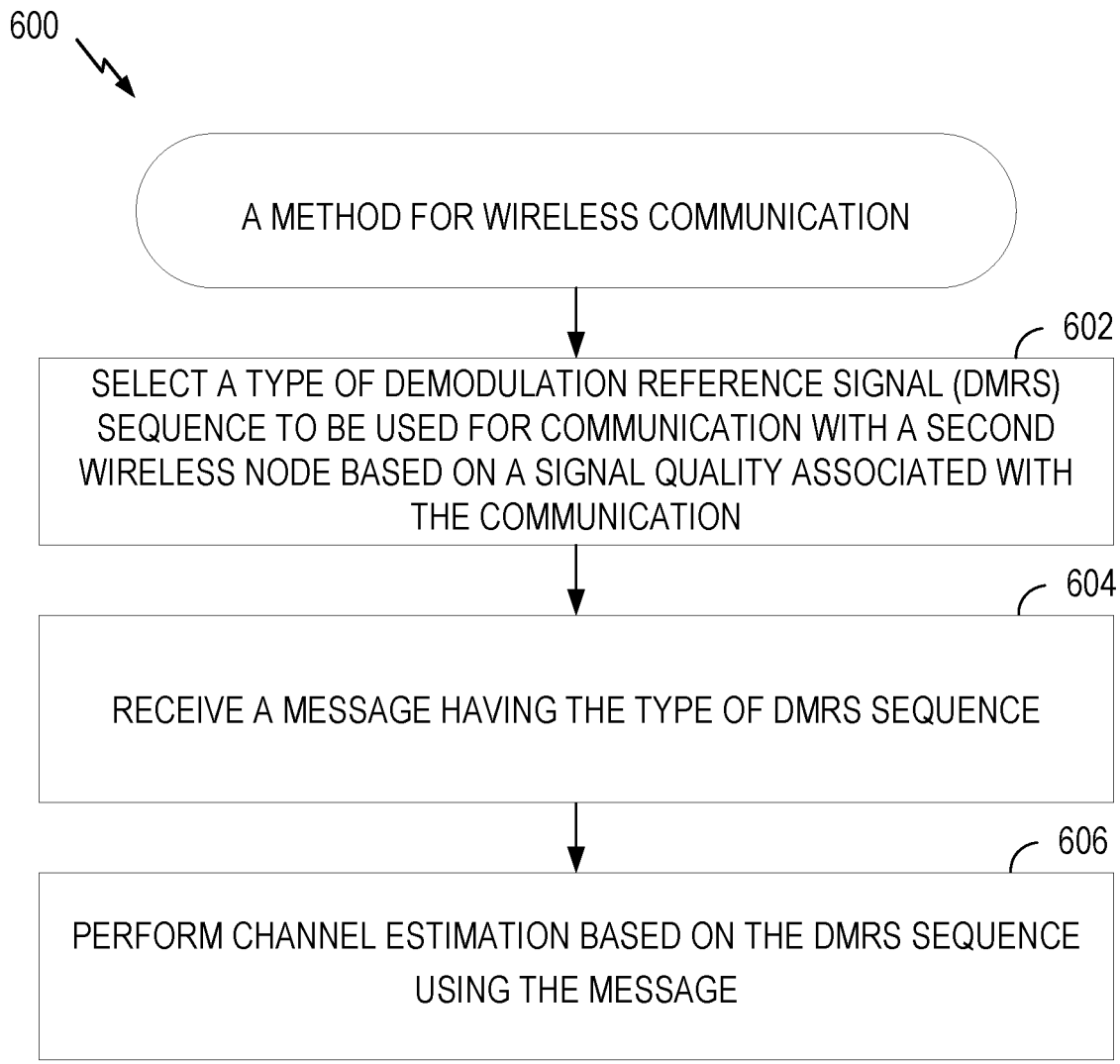
FIG. 6 is a flow diagram illustrating example operations for wireless communication by a receiver device, in accordance with certain aspects of the present disclosure.

FIG. 6 is a flow diagram illustrating example operations 600 for wireless communication, in accordance with certain aspects of the present disclosure. The operations 600 may be performed, for example, by a second wireless node (e.g., a BS such as the BS 102 in the wireless communication network 100 of FIG. 1 or a UE, such as the UE 104 in the wireless communication system 100 of FIG. 1). The operations 600 may be implemented as software components that are executed and run on one or more processors (e.g., controller/processor 240 280 or DMRS component 241 or 281 of FIG. 2). Further, the transmission and reception of signals by the UE in operations 600 may be enabled, for example, by one or more antennas (e.g., antennas 234 or 252 of FIG. 2). In certain aspects, the transmission and/or reception of signals by the UE may be implemented via a bus interface of one or more processors (e.g., controller/processor 240 or 280) obtaining and/or outputting signals.

The operations 600 begin, at block 602, with the first wireless node (e.g., a UE) selecting a type of DMRS sequence to be used for communication with a second wireless node (e.g., a BS) based on a signal quality associated with the communication. For example, the first wireless node may determine a MCS to be used for the communication with the wireless node. The selecting of the type of DMRS sequence at block 602 may include selecting the type of DMRS sequence based on the MCS.

At block 604, the first wireless node may receive a message having the type of DMRS sequence. For example, the first wireless node (e.g., UE 104) may receive the message via antennas 252.

At block 606, the first wireless node may perform channel estimation (e.g., via channel estimation component 418) based on the DMRS sequence using the message.

Figure 7:
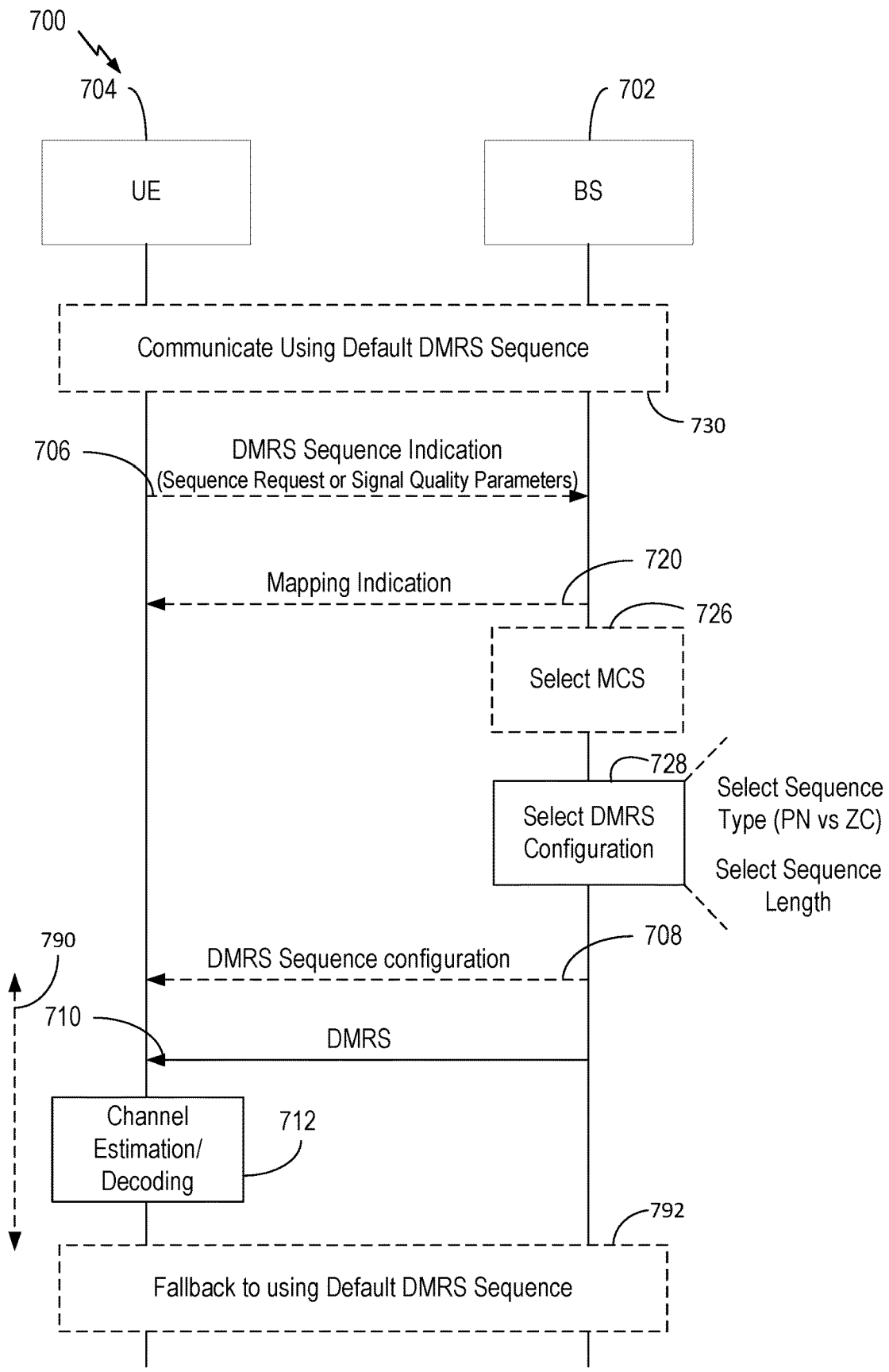
FIG. 7 depicts a process for demodulation reference signal (DMRS) sequence selection, in accordance with certain aspects of the present disclosure.

FIG. 7 depicts a process 700 for DMRS sequence selection, in accordance with certain aspects of the present disclosure.

As illustrated, at block 728, the BS 702 may select a DMRS configuration. For example, the BS 702 may, at block 726, select an MCS for communication with the UE 704, and at block 728, select either a PN sequence or a ZC sequence for DMRS based on the selected MCS, as described herein. The BS 702 may then transmit, to the UE 704, a message having the DMRS 710. At block 712, the UE 704 may perform channel estimation and decoding based on the DMRS 710, as illustrated.

In some aspects, the DMRS sequence type may be selected at block 728 based on Doppler spread. For example, in a high Doppler scenario (e.g., where a UE is moving at a high velocity), a shorter DMRS sequence may accommodate the shorter coherence time. In some cases, when a shorter DMRS sequence is selected for a higher Doppler spread, more than one DMRS may be included in a slot to more effectively estimate the channel. A shorter PN sequence may be avoided in some cases due to the more elevated side peaks associated with PN sequences.

In some aspects, a DMRS sequence type configuration 708 may be communicated between a transmitter (e.g., BS 702) and a receiver (e.g., a UE 704). For example, a BS 702 may directly (e.g., explicitly) indicate to a UE 704 information regarding the selected type of DMRS sequence. The DMRS sequence type configuration 708 may be indicated to the UE 704 using downlink control information (DCI) in a physical downlink control channel (PDCCH), a medium access control (MAC)-control element (CE), or through radio resource control (RRC) configuration.

In some aspects, a default DMRS sequence type may be defined and used as a fallback configuration. For example, at block 730, BS 702 and UE 704 may communicate using a default DMRS sequence type that may be preconfigured (e.g., using RRC signaling or configured in a standard specification).

If the BS 702 does not explicitly indicate a selected DMRS sequence type to the UE 704, the UE 704 may use the default DMRS sequence type (e.g., at block 730). A particular DMRS sequence type configuration may stay valid until a new configuration is signaled to the UE 704. In some aspects, a configured DMRS sequence configuration may be valid for a particular time period 790. For instance, a timer may be defined as associated with the configuration for the DMRS sequence type. Once the timer expires, the system falls back to employing the default DMRS sequence type (e.g., at block 792).

In some aspects, the BS 702 may indicate the DMRS sequence type indirectly by associating the DMRS sequence type with an MCS. For example, a static configuration may be employed with a fixed MCS-to-DMRS sequence mapping. In such a case, the BS 702 may not explicitly signal the selected DMRS sequence type, but rather, the DMRS sequence type may be implicitly signaled based on a configured MCS to be used.

In some aspects, the MCS-to-DMRS sequence type mapping may be configured dynamically or semi-statically. In other words, a configurable MCS-to-DMRS sequence type mapping may be defined and modified over time. In some implementations, several MCS-to-DMRS sequence type mappings may be pre-defined, allowing the BS 702 and UE 704 to switch between the mappings given various scenarios. As illustrated, the mapping 720 may be conveyed to the UE 704. In some aspects, a mapping may be conveyed to the UE 704 via a radio resource control (RRC) message and later enabled or disabled via downlink control information (DCI).

In some implementations, the DMRS sequence type configuration may be selected based on a UE indication (also referred to as UE feedback). For example, the BS 702 may receive a DMRS sequence indication 706 from the UE 704 that may be considered for selection of the DMRS sequence type configuration. That is, the UE 704 feedback may include feedback indicating the processing capability of the UE 704, which may be considered by the BS 702 for the selection of the DMRS sequence type configuration at block 728. For example, if the UE is a low capability UE (also referred to as reduced capability (redcap) UE), a PN sequence may be selected that is associated with a lower processing complexity as compared to a ZC sequence.

In some aspects, the UE feedback may include feedback indicating a measured SINR and/or Doppler spread of the UE 704. In other words, the BS 702 may select the DMRS sequence type and length based on the SINR and Doppler spread indicated by the UE 704. In some aspects, the feedback may be conveyed as part of channel state information (CSI) feedback. In other words, the BS 702 may transmit a CSI-reference signal (CSI-RS) to the UE 704, based on which the UE 704 may provide CSI feedback to the BS 702. The CSI feedback may include the DMRS sequence indication 706.

In some implementations, the feedback from the UE 704 may be direct. In other words, the UE 704 may directly request a specific DMRS sequence type to be used. For example, the DMRS sequence indication 706 may request a specific DMRS sequence type to be selected. The request may be included in a new layer-1 (L1) message or included in some existing L1 message (e.g., as part of downlink control information (DCI)). The request may be conveyed via a layer-3 (L3) message (e.g., radio resource control (RRC) message). The BS 702 may consider, but may not obey the UE 704's feedback request in some cases. In other words, the BS 702 may configure a DMRS sequence type that is different from a DMRS sequence type requested as part of the UE's feedback.

Example Wireless Communication Devices

Figure 8:
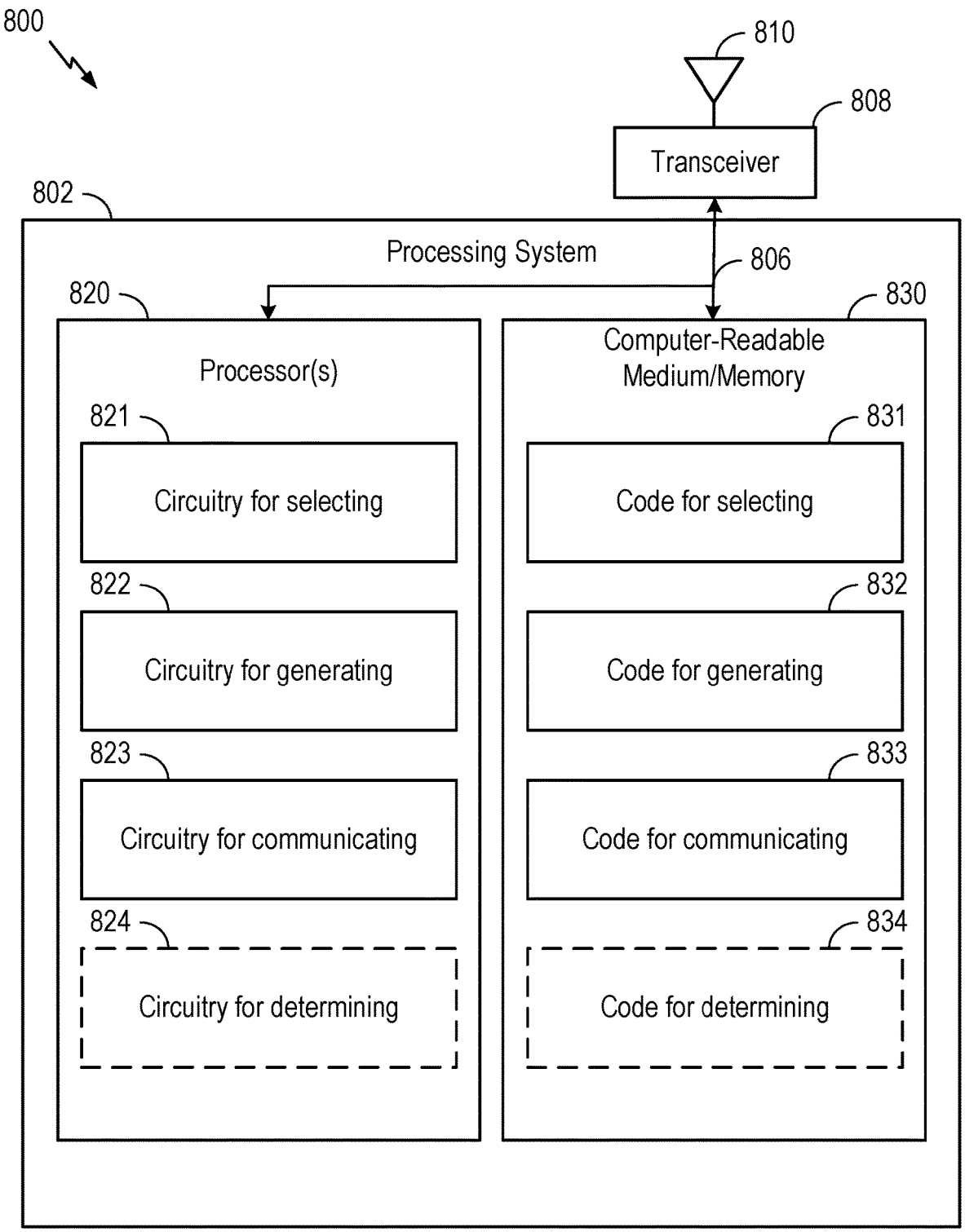
FIGS. 8 and 9 depict example communications devices.

FIG. 8 depicts an example communications device 800 that includes various components operable, configured, or adapted to perform operations for the techniques disclosed herein, such as the operations depicted and described with respect to FIG. 5. In some examples, communication device 800 may be a base station 102 as described, for example with respect to FIGS. 1 and 2. In some examples, communication device 800 may be a user equipment 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 5, or other operations for performing the various techniques discussed herein for DMRS sequence selection.

In the depicted example, computer-readable medium/memory 830 stores code 831 for selecting (e.g., selecting a type of DMRS sequence), code 832 for generating (e.g., generating a message), and code 833 for communicating (e.g., receiving or transmitting). The computer-readable medium/memory 830 may also optionally include code 834 for determining (e.g., determining an MCS).

In the depicted example, the one or more processors 820 include circuitry configured to implement the code stored in the computer-readable medium/memory 830, including circuitry 821 for selecting (e.g., selecting a type of DMRS sequence), circuitry 822 for generating (e.g., generating a message), and circuitry 823 for communicating (e.g., receiving or transmitting). The one or more processors 820 may also optionally include circuitry 824 for determining (e.g., determining an MCS).

Various components of communications device 800 may provide means for performing the methods described herein, including with respect to FIG. 5.

In some examples, means for transmitting or sending (or means for outputting for transmission) may include the transceivers 232 or 254 and/or antenna(s) 234 or 252 of the base station 102 or user equipment 104 illustrated in FIG. 2 and/or transceiver 808 and antenna 810 of the communication device 800 in FIG. 8.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving (or means for obtaining) may include the transceivers 232 or 254 and/or antenna(s) 234 or 252 of the base station or user equipment illustrated in FIG. 2 and/or transceiver 808 and antenna 810 of the communication device 800 in FIG. 8.

In some examples, means for selecting, means for generating, means for communication, means for determining may include various processing system components, such as: the one or more processors 820 in FIG. 8, or aspects of the base station 102 or user equipment 104 depicted in FIG. 2, including receive processor 238 or 258, transmit processor 220 or 264, TX MIMO processor 230 or 266, and/or controller/processor 240 or 280 (including DMRS component 241 or 281).

Notably, FIG. 8 is just one use example, and many other examples and configurations of communication device 800 are possible.

Figure 9:
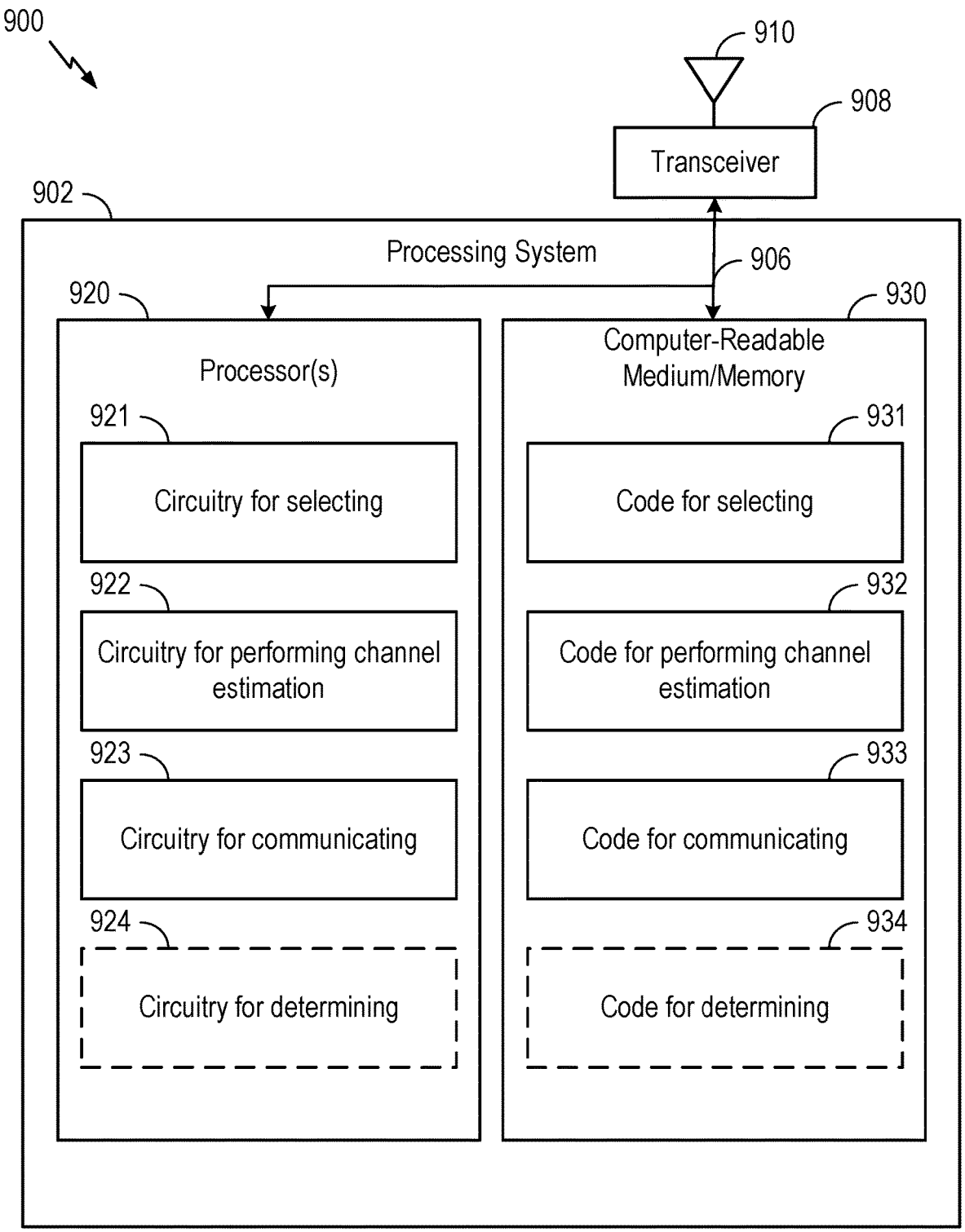

FIG. 9 depicts an example communications device 900 that includes various components operable, configured, or adapted to perform operations for the techniques disclosed herein, such as the operations depicted and described with respect to FIG. 6. In some examples, communication device 900 may be a user equipment 104 as described, for example with respect to FIGS. 1 and 2. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 6, or other operations for performing the various techniques discussed herein for DMRS sequence selection.

In the depicted example, computer-readable medium/memory 930 stores code 931 for selecting (e.g., selecting a type of DMRS sequence), code 932 for performing channel estimation, and code 933 for communicating (e.g., receiving or transmitting). The computer-readable medium/memory 930 may also optionally include code 934 for determining (e.g., determining an MCS)

In the depicted example, the one or more processors 920 include circuitry configured to implement the code stored in the computer-readable medium/memory 930, including circuitry 921 for selecting (e.g., selecting a type of DMRS sequence), circuitry 922 for performing channel estimation, and circuitry 923 for communicating (e.g., receiving or transmitting). The one or more processors 920 may also optionally include circuitry 924 for determining (e.g., determining an MCS).

Various components of communications device 900 may provide means for performing the methods described herein, including with respect to FIG. 6.

In some examples, means for transmitting or sending (or means for outputting for transmission) may include the transceivers 232 or 254 and/or antenna(s) 234 or 252 of the base station 102 or user equipment 104 illustrated in FIG. 2 and/or transceiver 908 and antenna 910 of the communication device 900 in FIG. 9.

In some examples, means for receiving (or means for obtaining) may include the transceivers 232 or 254 and/or antenna(s) 234 or 252 of the base station 102 or user equipment 104 illustrated in FIG. 2 and/or transceiver 908 and antenna 910 of the communication device 900 in FIG. 9.

In some examples, means for selecting, means for performing channel estimation, means for communicating, and means for determining may include various processing system components, such as: the one or more processors 920 in FIG. 9, or aspects of the base station 102 or user equipment 104 depicted in FIG. 2, including receive processor 258, transmit processor 220 or 264, TX MIMO processor 230 or 266, and/or controller/processor 240 or 280 (including DMRS component 241 or 281).

Notably, FIG. 9 is just one use example, and many other examples and configurations of communication device 900 are possible.

Example Clauses

Implementation examples are described in the following numbered clauses:

Clause 1. A method for wireless communication by a first wireless node, comprising: selecting a type of demodulation reference signal (DMRS) sequence to be used for communication with a second wireless node based on a signal quality associated with the communication; generating a message having the type of DMRS sequence; and transmitting the message to the second wireless node.

Clause 2. The method of Clause 1, wherein the signal quality comprises signal-to-interference-plus-noise ratio (SINR).

Clause 3. The method of any one of Clauses 1-2, further comprising determining a modulation and coding scheme (MCS) to be used for the communication with the second wireless node, wherein the selecting of the type of DMRS sequence comprises selecting the type of DMRS sequence based on the MCS.

Clause 4. The method of Clause 3, wherein: if the determined MCS is a first MCS, the selected type of DMRS sequence comprises a pseudo-noise (PN) sequence; and if the determined MCS is a second MCS, the selected type of DMRS sequence comprises a Zadoff-Chu (ZC) sequence, the second MCS having a higher order than the first MCS.

Clause 5. The method of any one of Clauses 1-4, further comprising transmitting, to the second wireless node, an indication of the selected type of DMRS sequence.

Clause 6. The method of Clause 5, further comprising communicating with the second wireless node using a default DMRS sequence type prior to transmitting the indication of the selected type of DMRS sequence.

Clause 7. The method of any one of Clauses 1-6, wherein the selecting of the type of DMRS sequence based on the signal quality comprises selecting the type of DMRS sequence based on a mapping between one or more candidate MCSs and one or more candidate DMRS sequence types.

Clause 8. The method of Clause 7, further comprising indicating the mapping to the second wireless node.

Clause 9. The method of any one of Clauses 1-8, wherein the selected type of DMRS sequence is active for a configured time period.

Clause 10. The method of any one of Clauses 1-9, wherein the selecting of the type of DMRS sequence based on the signal quality comprises selecting a length of the DMRS sequence based at least in part on a Doppler spread associated with the communication.

Clause 11. The method of any one of Clauses 1-10, further comprising receiving an indication from the second wireless node, wherein selecting the type of DMRS sequence is further based on the indication from the second wireless node.

Clause 12. The method of Clause 11, wherein the indication comprises a request for a type of DMRS sequence to be used for the communication.

Clause 13. The method of Clause 12, wherein the type of DMRS sequence requested by the second wireless node is different than the type of DMRS sequence selected by the first wireless node.

Clause 14. The method of any one of Clauses 11-13, wherein the indication comprises an indication of one or more signal quality parameters associated with communication.

Clause 15. The method of Clause 14, wherein the one or more signal quality parameters comprise at least one of: a signal-to-interference-plus-noise ratio (SINR) parameter; or an indication of a Doppler spread associated with the communication.

Clause 16. The method of any one of Clauses 11-15, wherein the indication comprises an indication of a processing capability of the second wireless node.

Clause 17. The method of any one of Clauses 11-16, wherein the indication is received as part of channel state information (CSI) feedback.

Clause 18. The method of any one of Clauses 11-17, wherein the indication is received as part of layer-1 (L1) signaling or layer-3 (L3) signaling.

Clause 19. The method of any one of Clauses 1-18, wherein the first wireless node comprises a base station and the second wireless node comprises a user equipment (UE).

Clause 20. A method for wireless communication by a first wireless node, comprising: selecting a type of demodulation reference signal (DMRS) sequence to be used for communication with a second wireless node based on a signal quality associated with the communication; receiving a message having the type of DMRS sequence; and performing channel estimation based on the DMRS sequence using the message.

Clause 21. The method of Clause 20, wherein the signal quality comprises signal-to-interference-plus-noise ratio (SINR).

Clause 22. The method of any one of Clauses 20-21, further comprising determining a modulation and coding scheme (MCS) to be used for the communication with the second wireless node, wherein the selecting of the type of DMRS sequence comprises selecting the type of DMRS sequence based on the MCS.

Clause 23. The method of Clause 22, wherein: if the determined MCS is a first MCS, the selected the type of DMRS sequence comprise a pseudo-noise (PN) sequence; and if the determined MCS is a second MCS, the selected the type of DMRS sequence comprise a Zadoff-Chu (ZC) sequence, the second MCS having a higher order than the first MCS.

Clause 24. The method of any one of Clauses 20-23, further comprising receiving, from the second wireless node, an indication of the selected type of DMRS sequence.

Clause 25. The method of Clause 24, further comprising communicating with the second wireless node using a default DMRS sequence type prior to receiving the indication of the selected type of DMRS sequence.

Clause 26. The method of any one of Clauses 20-25, wherein the selecting of the type of DMRS sequence based on the signal quality comprises selecting the type of DMRS sequence based on a mapping between one or more candidate MCSs and one or more candidate DMRS sequence types.

Clause 27. The method of Clause 26, further comprising receiving an indication of the mapping from the second wireless node.

Clause 28. The method of any one of Clauses 20-27, wherein the selected type of DMRS sequence is active for a configured time period.

Clause 29. The method of any one of Clauses 20-28, wherein the selecting of the type of DMRS sequence based on the signal quality comprises selecting a length of the DMRS sequence based at least in part on a Doppler spread associated with the communication.

Clause 30. The method of any one of Clauses 20-29, further comprising transmitting, the second wireless node, an indication to the second wireless node to be used for selecting the type of DMRS sequence.

Clause 31. The method of Clause 30, wherein the indication comprises a request for a type of DMRS sequence to be used for the communication.

Clause 32. The method of Clause 31, further comprising receiving, from the second wireless node, an indication of the type of DMRS sequence, wherein the type of DMRS sequence requested by the first wireless node is different than the type of DMRS sequence indicated from the second wireless node.

Clause 33. The method of any one of Clauses 30-32, wherein the indication comprises an indication of one or more signal quality parameters associated with communication.

Clause 34. The method of Clause 33, wherein the one or more signal quality parameters comprise at least one of: a signal-to-interference-plus-noise ratio (SINR) parameter; or an indication of a Doppler spread associated with the communication.

Clause 35. The method of any one of Clauses 30-34, wherein the indication comprises an indication of a processing capability of the second wireless node.

Clause 36. The method of any one of Clauses 30-35, wherein the indication is received as part of channel state information (CSI) feedback.

Clause 37. The method of any one of Clauses 30-36, wherein the indication is received as part of layer-1 (L1) signaling or layer-3 (L3) signaling.

Clause 38. The method of any one of Clauses 20-37, wherein the first wireless node comprises a user equipment (UE) and the second wireless node comprises a base station.

Clause 39: An apparatus, comprising: a memory comprising executable instructions; one or more processors configured to execute the executable instructions and cause the apparatus to perform a method in accordance with any one of Clauses 1-38.

Clause 40: An apparatus, comprising means for performing a method in accordance with any one of Clauses 1-38.

Clause 41: A non-transitory computer-readable medium comprising executable instructions that, when executed by one or more processors of an apparatus, cause the apparatus to perform a method in accordance with any one of Clauses 1-38.

Clause 42: A computer program product embodied on a computer-readable storage medium comprising code for performing a method in accordance with any one of Clauses 1-38.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication system 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an for users in the home). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration. For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DMRS) (indicated as Rx for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of DMRS configuration in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a first wireless node, comprising one or more processors coupled to a memory and configured to:
   select a type of demodulation reference signal (DMRS) sequence to be used for communication with a second wireless node based on a signal quality associated with the communication;
   generate a message having the type of DMRS sequence; and
   transmit the message to the second wireless node,
   wherein the one or more processors are configured to:
      determine a modulation and coding scheme (MCS) to be used for the communication with the second wireless node and select the type of DMRS sequence based on the MCS, wherein the selected type of DMRS sequence comprises a pseudo-noise (PN) sequence when the MCS is a first MCS and the selected type of DMRS sequence comprises a Zadoff-Chu (ZC) sequence when the MCS is a second MCS, the second MCS having a higher order than the first MCS; or
      select the type of DMRS sequence based on a mapping between one or more candidate MCSs and one or more candidate DMRS sequence types; or
      select a length of the DMRS sequence based at least in part on a Doppler spread associated with the communication.

2. The method of claim 1, wherein the one or more processors are configured to determine the modulation and coding scheme (MCS) to be used for the communication with the second wireless node and select the type of DMRS sequence based on the MCS, and wherein:
   when the MCS is the first MCS, the selected type of DMRS sequence comprises the pseudo-noise (PN) sequence; and
   when the MCS is the second MCS, the selected type of DMRS sequence comprises the Zadoff-Chu (ZC) sequence, the second MCS having the higher order than the first MCS.

3. The apparatus of claim 1, wherein the one or more processors are configured to: transmit, to the second wireless node, an indication of the selected type of DMRS sequence.

4. The apparatus of claim 3, wherein the one or more processors are configured to: communicate with the second wireless node using a default DMRS sequence type prior to transmission of the indication of the selected type of DMRS sequence.

5. The apparatus of claim 1, wherein one or more processors are configured to: select the type of DMRS sequence based on the mapping between the one or more candidate MCSs and the one or more candidate DMRS sequence types.

6. The apparatus of claim 5, wherein the one or more processors are configured to: indicate the mapping to the second wireless node.

7. The apparatus of claim 1, wherein the one or more processors are configured to: select the length of the DMRS sequence based at least in part on the Doppler spread associated with the communication.

8. The apparatus of claim 1, wherein the one or more processors are configured to: receive an indication from the second wireless node, wherein selection of the type of DMRS sequence is further based on the indication from the second wireless node.

9. The apparatus of claim 8, wherein the indication comprises a request for a type of DMRS sequence to be used for the communication, or wherein the indication comprises an indication of one or more signal quality parameters associated with communication, or wherein the indication comprises an indication of a processing capability of the second wireless node.

10. The apparatus of claim 9, wherein the indication comprises the indication of one or more signal quality parameters associated with communication, and wherein the one or more signal quality parameters comprise at least one of:
    a signal-to-interference-plus-noise ratio (SINR) parameter; or
    an indication of the Doppler spread associated with the communication.

11. The apparatus of claim 8, wherein the one or more processors are configured to receive the indication as part of channel state information (CSI) feedback.

12. An apparatus for wireless communication by a first wireless node, comprising one or more processors coupled to a memory and configured to:
    select a type of demodulation reference signal (DMRS) sequence to be used for communication with a second wireless node based on a signal quality associated with the communication;
    receive, from the second wireless node, a message having the type of DMRS sequence; and
    perform channel estimation based on the type of DMRS sequence using the message,
    wherein the one or more processors are configured to:
        determine a modulation and coding scheme (MCS) to be used for the communication with the second wireless node and select the type of DMRS sequence based on the MCS, wherein the selected the type of DMRS sequence comprises a pseudo-noise (PN) sequence when the MCS is a first MCS and the selected the type of DMRS sequence comprises a Zadoff-Chu (ZC) sequence when the MCS is a second MCS, the second MCS having a higher order than the first MCS; or
        select the type of DMRS sequence based on a mapping between one or more candidate MCSs and one or more candidate DMRS sequence types; or
        select a length of the DMRS sequence based at least in part on a Doppler spread associated with the communication.

13. The apparatus of claim 12, wherein the one or more processors are configured to determine the modulation and coding scheme (MCS) to be used for the communication with the second wireless node and select the type of DMRS sequence based on the MCS and wherein:
    when the MCS is the first MCS, the selected type of DMRS sequence comprises the pseudo-noise (PN) sequence; and
    when the MCS is the second MCS, the selected type of DMRS sequence comprises the Zadoff-Chu (ZC) sequence, the second MCS having the higher order than the first MCS.

14. The apparatus of claim 12, wherein the one or more processors are configured to: receive, from the second wireless node, an indication of the selected type of DMRS sequence.

15. The apparatus of claim 14, wherein the one or more processors are configured to: communicate with the second wireless node using a default DMRS sequence type prior to receiving the indication of the selected type of DMRS sequence.

16. The apparatus of claim 12, wherein the one or more processors are configured to: select the type of DMRS sequence based on the mapping between the one or more candidate MCSs and the one or more candidate DMRS sequence types.

17. The apparatus of claim 16, wherein the one or more processors are configured to: receive an indication of the mapping from the second wireless node.

18. The apparatus of claim 12, wherein the one or more processors are configured to: select the length of the DMRS sequence based at least in part on the Doppler spread associated with the communication.

19. The apparatus of claim 12, wherein the one or more processors are configured to transmit, the second wireless node, an indication to the second wireless node to be used for selection of the type of DMRS sequence.

20. The apparatus of claim 19, wherein the indication comprises a request for a type of DMRS sequence to be used for the communication, or wherein the indication comprises an indication of one or more signal quality parameters associated with communication, or wherein the indication comprises an indication of a processing capability of the second wireless node.

21. The apparatus of claim 20, wherein the indication comprises the indication of one or more signal quality parameters associated with communication, and wherein the one or more signal quality parameters comprise at least one of:
    a signal-to-interference-plus-noise ratio (SINR) parameter; or
    an indication of the Doppler spread associated with the communication.

22. The apparatus of claim 19, wherein the one or more processors are configured to receive the indication as part of channel state information (CSI) feedback.

23. A method for wireless communication by a first wireless node, comprising:
    selecting a type of demodulation reference signal (DMRS) sequence to be used for communication with a second wireless node based on a signal quality associated with the communication;
    generating a message having the type of DMRS sequence; and
    transmitting the message to the second wireless node,
    wherein the method further comprises:
        determining a modulation and coding scheme (MCS) to be used for the communication with the second wireless node and selecting the type of DMRS sequence based on the MCS, wherein the selected type of DMRS sequence comprises a pseudo-noise (PN) sequence when the MCS is a first MCS and the selected type of DMRS sequence comprises a Zadoff-Chu (ZC) sequence when the MCS is a second MCS, the second MCS having a higher order than the first MCS; or selecting the type of DMRS sequence based on a mapping between one or more candidate MCSs and one or more candidate DMRS sequence types; or selecting a length of the DMRS sequence based at least in part on a Doppler spread associated with the communication.

24. A method for wireless communication by a first wireless node, comprising:

selecting a type of demodulation reference signal (DMRS) sequence to be used for communication with a second wireless node based on a signal quality associated with the communication;

receiving, from the second wireless node, a message having the type of DMRS sequence; and performing channel estimation based on the DMRS sequence using the message, wherein the method further comprises:

determining a modulation and coding scheme (MCS) to be used for the communication with the second wireless node and selecting the type of DMRS sequence based on the MCS, wherein the selected the type of DMRS sequence comprises a pseudo-noise (PN) sequence when the MCS is a first MCS and the selected the type of DMRS sequence comprises a Zadoff-Chu (ZC) sequence when the MCS is a second MCS, the second MCS having a higher order than the first MCS; or selecting the type of DMRS sequence based on a mapping between one or more candidate MCSs and one or more candidate DMRS sequence types; or selecting a length of the DMRS sequence based at least in part on a Doppler spread associated with the communication.

25. The method of claim 23, wherein the method comprises:

determining the modulation and coding scheme (MCS) to be used for the communication with the second wireless node; and selecting the type of DMRS sequence based on the MCS, wherein:

when the MCS is the first MCS, the selected type of DMRS sequence comprises the pseudo-noise (PN) sequence; and when the MCS is the second MCS, the selected type of DMRS sequence comprises the Zadoff-Chu (ZC) sequence, the second MCS having the higher order than the first MCS.

26. The method of claim 23, wherein the method comprises: selecting the type of DMRS sequence based on the mapping between the one or more candidate MCSs and the one or more candidate DMRS sequence types.

27. The method of claim 23, wherein the method comprises: selecting the length of the DMRS sequence based at least in part on the Doppler spread associated with the communication.

28. The method of claim 24, wherein the method comprises:

determining the modulation and coding scheme (MCS) to be used for the communication with the second wireless node; and selecting the type of DMRS sequence based on the MCS, wherein:

when the MCS is the first MCS, the selected type of DMRS sequence comprises the pseudo-noise (PN) sequence; and when the MCS is the second MCS, the selected type of DMRS sequence comprises the Zadoff-Chu (ZC) sequence, the second MCS having the higher order than the first MCS.

29. The method of claim 24, wherein the method comprises: selecting the type of DMRS sequence based on the mapping between the one or more candidate MCSs and the one or more candidate DMRS sequence types.

30. The method of claim 24, wherein the method comprises: selecting the length of the DMRS sequence based at least in part on the Doppler spread associated with the communication.

* * * * *